Dec. 6, 1949     R. P. NORTON     2,490,371
PIPE FACING MACHINE
Filed Jan. 9, 1946     3 Sheets-Sheet 1
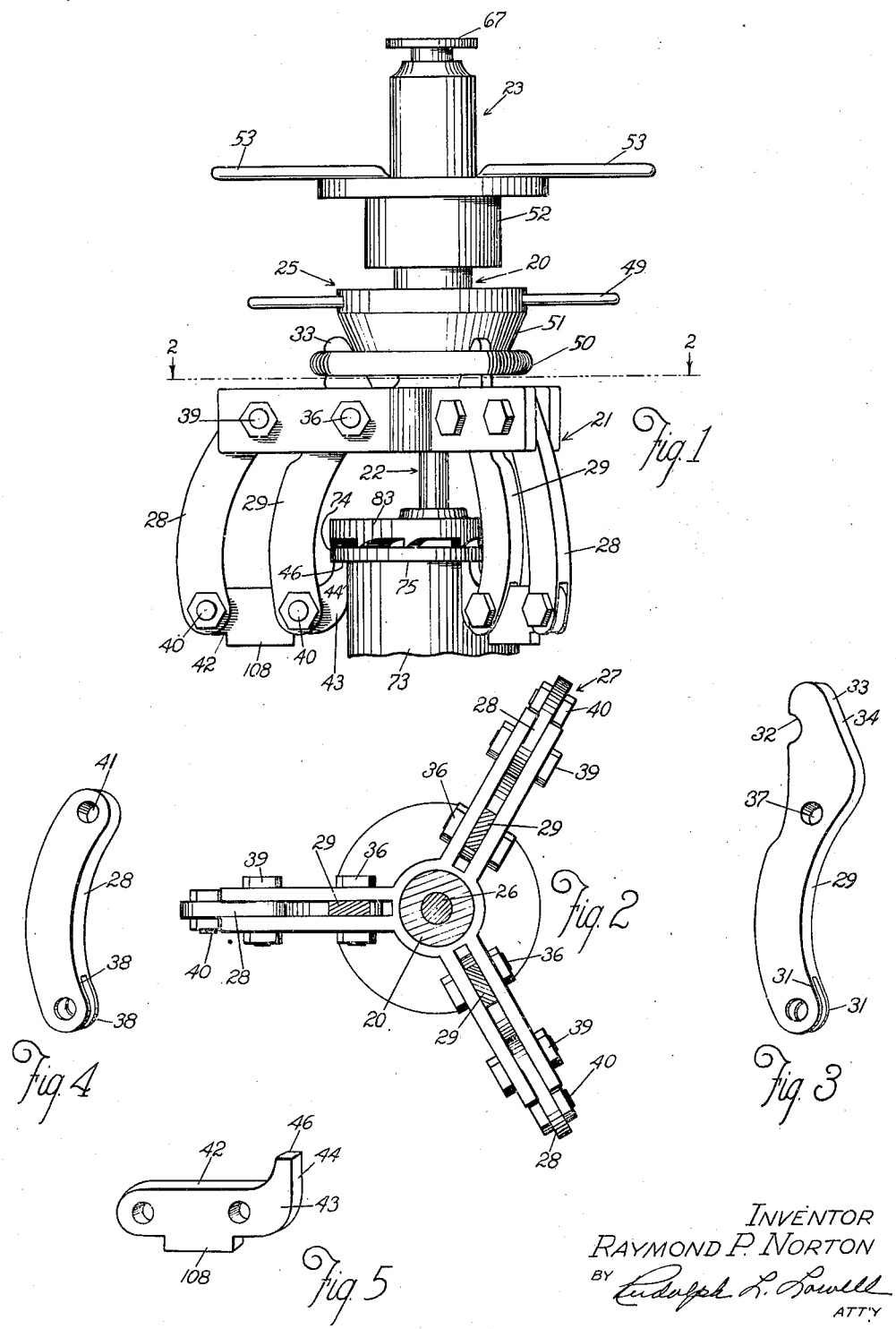
INVENTOR
RAYMOND P. NORTON
BY Rudolph L. Lowell
ATT'Y Dec. 6, 1949  R. P. NORTON  2,490,371
PIPE FACING MACHINE Filed Jan. 9, 1946  3 Sheets-Sheet 2

INVENTOR
RAYMOND P. NORTON
BY Rudolph L. Lowell
ATT'

Dec. 6, 1949          R. P. NORTON          2,490,371
PIPE FACING MACHINE
Filed Jan. 9, 1946          3 Sheets-Sheet 3
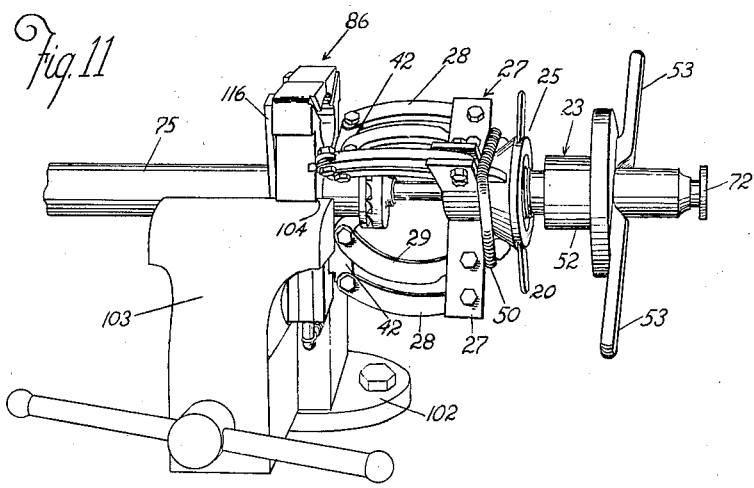
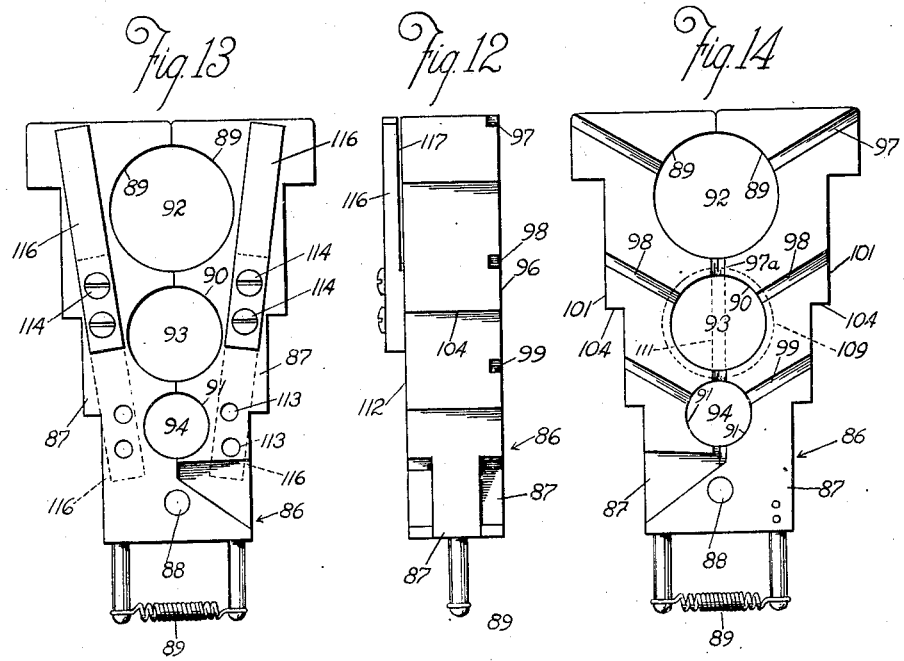
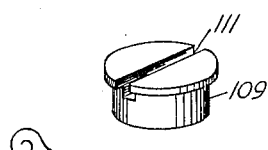
INVENTOR
RAYMOND P. NORTON
BY Rudolph L. Lowell
ATTY Patented Dec. 6, 1949

2,490,371

UNITED STATES PATENT OFFICE 2,490,371

PIPE FACING MACHINE

Raymond P. Norton, Algona, Iowa

Application January 9, 1946, Serial No. 640,122

4 Claims. (Cl. 90—12.5)

This invention relates generally to facing machines for facing the ends of pipes, and in particular to a portable machine for accurately refacing pipe ends and fittings.

The connecting vats, tanks and various machines used in milk, food processing and like plants are interconnected by tube or pipe systems formed of separate pipe lengths provided with fittings including ferrules which are either expanded or soldered on the ends of the pipe lengths. These ferrules may be of either the "tapered" type in which the mating ferrules in a fitting are adapted for direct contact, or the "flat" type in which a gasket or the like is interposed between a pair of mating ferrules in a fitting.

It is common practice when the fitting is assembled to have the pipe end project beyond or through the ferrule. The pipe end is then cut flush with the ferrule, and the flush surfaces are faced to eliminate or avoid any distortion in the pipe resulting from the expanding or soldering operation.

In milk plants the refacing of pipe fittings is a frequent procedure because the pipes are usually taken apart daily to be sterilized by passing live steam through them. It often happens that due to the accidental dropping of a pipe, or in assembling pipes together that a fitting becomes damaged and must be refaced to eliminate leakage. Also when a fitting becomes worn and leaks, it is necessary to cut the fitting from the pipe and the pipe provided with a new fitting. It is seen, therefore, that all fittings are not only faced in the initial assembly of the pipe system in milk and food processing plants, but that the refacing of these fittings is a frequent and daily procedure because of the necessity of sterilizing the pipes and maintaining the fittings against leakage.

It is an object of this invention, therefore, to provide an improved machine for facing the ends of pipes.

Another object of this invention is to provide a machine for accurately refacing pipe fittings which is light in weight, of a compact and simplified design, and efficient in operation.

Still another object of this invention is to provide a combination pipe facing and pipe cutting tool.

A further object of this invention is to provide a machine for facing pipe ends, in which a pipe gripping and holding unit is capable of gripping and positively supporting pipes of varying diameters in a centered and aligned relation with a refacing tool of the machine.

Yet another object of this invention is to provide a machine for facing the end of a pipe which is light in weight, so as to be readily and easily handled by one man, capable of operation on a single pipe length, or an attached pipe fitting, and adapted to positively grip a pipe without distorting the shape of the pipe.

A further object of this invention is to provide a machine for facing the end of a pipe, in which the pipe is extended through and clamped in a base member adapted to be gripped in a vice and cooperable with a pipe gripping and holding unit on the machine to support the machine against lateral tipping movement during a pipe facing operation.

A feature of this invention is found in the provision of a machine for facing the end of a pipe in which a pipe gripping and holding unit includes a plurality of clamping members supported by parallel link systems on a body member for movement in planes extended radially of a rotary facing tool positioned therebetween, whereby the inner gripping edges of the clamp members are in planes parallel to the axis of the facing tool at all moved positions of the clamp members to center and align the pipe end to be faced relative to the facing tool.

Another feature of this invention is found in the provision of a machine for facing the end of a pipe in which a rotary cutting tool, rotatably supported in a body member of the machine, is rotated by a manually operated rotary unit releasably locked in full bearing engagement with the body member, and axially movable by a feed screw rotatable in the operating unit and threadably connected with the inner end of the cutting tool.

Further objects, features and advantages of this invention will become apparent from the following description when taken in connection with the accompanying drawings in which:

Fig. 1 is a side elevational view of the facing machine of this invention shown in assembly with a pipe to be faced;

Fig. 2 is a transverse sectional view taken on the line 2—2 in Fig. 1;

Fig. 3 is a perspective view of a link member forming part of the pipe gripping and holding unit of the machine;

Fig. 4 is a perspective view of a second link member forming part of the pipe gripping and holding unit of the machine;

Fig. 5 is a perspective view of a clamp member forming part of the pipe gripping and holding unit;

Fig. 11 is a perspective view of the machine of this invention shown in operating position relative to a pipe to be faced, and to a vise supported base member adapted to hold the machine against tipping movement during a pipe facing operation;

Fig. 12 is a side elevational view of the base member in Fig. 11;

Fig. 13 is a rear elevational view of the base member looking toward the right in Fig. 12;

Fig. 14 is a front elevational view of the base member looking toward the left in Fig. 12; and Fig. 15 is a detail perspective view of a plug attachment for the base member.

Figure 6:
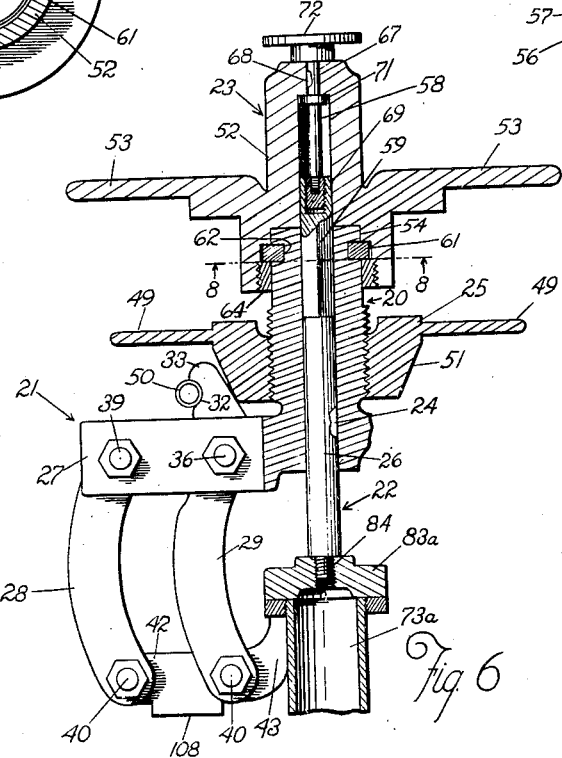
Fig. 6 is a fragmentary longitudinal sectional view of the machine in Fig. 1, shown in assembly relation with a pipe of a smaller diameter relative to the pipe illustrated in Fig. 1.

With reference to the drawings the pipe facing machine of this invention is illustrated in Figs. 1 and 6 as including a body member 20, a pipe gripping and holding unit, indicated generally as 21, a hand nut 25 for actuating the gripping unit, a facing tool 22 and a manually operated rotary unit 23 for operating the facing tool.

The body member 20 is of a generally cylindrical shape and is formed with an axial bore 24 for rotatably receiving a shaft 26 of the facing tool 22. The outer end of the body member 20 is provided with a plurality of angularly spaced projections 27, illustrated in Fig. 2 as being three in number, extended radially from the longitudinal axes of the bore 24 and shaft 26. Each projection 27 is of a bifurcated construction and adapted to receive therebetween parallel link members 28 and 29. Since the projections 27 are similarly assembled with a pair of links 28 and 29, only one of such assemblies will be described in detail.

A link 29 (Figs. 1 and 3) is of a somewhat irregular shape, formed with a pair of spaced ears 31 adjacent one end, and an arcuate recess 32 adjacent its opposite end 33. The edge or side portion 34 opposite the recess 32 constitutes a cam surface for a purpose which will appear later. The end 33 of the link 29 is positioned between the furcations of a projection 27 and supported for pivotal movement by a bolt 36 extended through the furcations and an opening 37 in the link 29 spaced inwardly from its end 33. As best appears in Figs. 1 and 6 the end 33 of the link 29 extends upwardly from a projection 27, with the recess 32 faced outwardly.

The link 28 (Figs. 1 and 4) is of an arcuate shape formed at one end with spaced ears 38. The link 28 is positioned between the furcations of a projection 27, adjacent to the free end of the projection, and is pivotally connected on a projection by a bolt 39 extended through aligned openings in the projection and through an opening 41 in the link 28.

Pivotally connected between the free ends of each pair of links 28 and 29, and positioned between the ears 38 and 31, respectively, is a clamp member 42. The distance between the bolts 36 and 39, is equal to the distance between the bolts 40, and the portions of the links 28 and 29 between their pivoted connections are of a like contour and of equal lengths whereby the links 28 and 29 constitute parallel link systems for guiding the movement of the clamp members 42 in radial directions relative to the longitudinal axis of the facing tool 22.

A clamp member 42 (Fig. 5) is of a generally straight form provided with an upturned inner end 43 the inner edge 44 of which is in a plane substantially parallel to the plane of the longitudinal axis of the facing tool 22. It is thus seen that for any moved position of the parallel links 28 and 29 the inner edge 44 of a clamp member 42 is disposed in a plane parallel to the longitudinal axis of the facing tool 22. The top surface 46 of the clamp and 43 is arranged in a plane normal to the inner edge or surface 44 for a purpose which will be hereinafter explained.

A concurrent actuation of the clamp members 42 for movement toward and away from the facing tool 22 is accomplished by means including the nut member 25 (Figs. 1 and 6) which is threadable on the outer periphery of the central portion of the body member 20 and formed with handle members 49. The outer peripheral surface 51 of the nut 25 adjacent its lower end, as viewed in Fig. 6, is tapered inwardly and downwardly and adapted for engagement with the cam edges 34 of the links 29. Contact engagement between the peripheral surface 51 of the nut 25 and the cam surfaces 34 is maintained by a coil spring 50 extended about the body member 20 and positioned within the recesses 32 of the links 29. By virtue of the action of the spring 50 the clamp members 42 are yieldably urged outwardly away from the facing tool 22. On threading of the nut 25 on the body member 20 towards the projections 27 the tapered surface 51 engages and moves downwardly along the cam surfaces 34 to move the clamp members 42 inwardly toward each other against the pressure of the spring 50.

Figure 7:
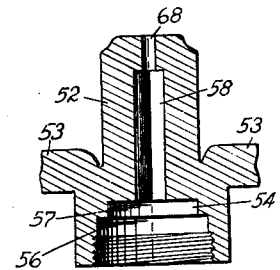
Fig. 7 is a fragmentary sectional detail view of a manually actuated rotary unit for operating the facing tool.

The facing tool 22 is operated on manual rotation of the unit 23 which is comprised of a substantially cylindrical cap member 52 formed with a pair of oppositely extended actuating handles 53 (Fig. 6). One end of the cap member 52 is formed with an axial cavity 54 having a sidewall of a stepped contour providing annular shoulders 56 and 57 (Fig. 7). Communicating with the annular cavity 54 is an axial bore 58 of a square shape in cross section, adapted to receive the end 59 of the shaft 26, which shaft end is of a square shape in cross section and projected outwardly from the upper end of the body member 20, as viewed in Fig. 6. The reception of the square shaft end 59 within the square bore 58 connects the facing tool 22 for rotation in response to a rotation of the unit 23.

Figure 8:
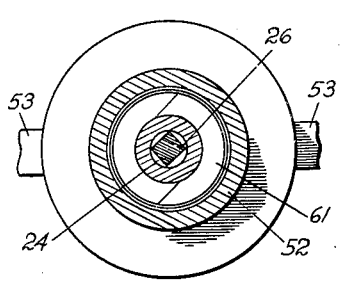
Fig. 8 is a transverse sectional view taken on the line 8—8 in Fig. 6.

The unit 23 is releasably locked in a rotatably supported position on the body member 20 by means including a split ring member 61 (Figs. 6, 7 and 8) loosely fitted within a peripheral groove 62 formed in the body member 20 adjacent its upper end, as viewed in Fig. 6. The upper end of the body member 20, with the split ring 61 assembled thereon, is receivable within the cavity 54 of the cap member 52 so that one side of the ring 61 is in contact engagement with the annular shoulder 57 on the sidewall of the cavity 54.

Figure 10:
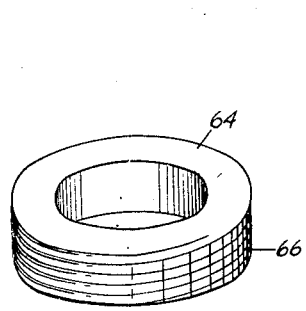
Fig. 10 is a perspective of a locking ring forming part of the locking means for the facing tool operating unit.
Figure 9:
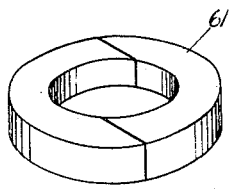
Fig. 9 is a perspective view of a split ring forming part of the means for releasably locking the manually actuated rotary unit for operating the facing tool, on the body member of the machine.

In order to releasably lock the cap member 52 against axial movement relative to the body member 20 a collar member 64 (Figs. 6 and 10) mounted about the upper end of the body member 20 and formed with external threads 66 is threadable within the cavity 54 to a stop position against the annular shoulder 56 and in contact engagement with the split ring 61, whereby the split ring is held against axial movement at a position between the cavity shoulders 56 and 57. By virtue of this assembly a full bearing engagement is provided between the body member 20 and cap member 52 to positively lock such members against separation. It is to be understood, of course, that the collar 64 is mounted about the body member 20 prior to the assembly of the cap member 52 on the body member 20.

The facing tool 22 is held against falling out of the machine by means including a feed screw 67 rotatably extended through a hole 68 in the outer end of the cap member 52, which opening communicates with and is in co-axial alignment with the bore 58 (Figs. 6 and 7). The inner end of the feed screw 67 is formed with left hand threads and is threadable within a plug member 69 in the squared end 59 of the shaft 26. Mounted on the screw 67 for bearing engagement against the bottom of the bore 58 is a collar member 71. The head 72 of the feed screw 67 is adapted for bearing engagement with the outer end of the cap member 52 and cooperates with the collar 71 to hold the feed screw 67 against axial movement.

In the assembly of the facing tool 22 within the machine, the shaft 26 is extended within the bores 24 and 58 until the squared end 59 of the shaft 26 is in engagement with the inner end of the feed screw 67. On rotation of the feed screw, in a counter-clockwise direction, its inner end is threaded within the plug member 69 whereby to draw the facing tool 22 inwardly of the machine. On rotation of the feed screw 67 in a clockwise direction the tool 22 is fed outwardly from the machine. To remove the tool 22 from the machine the rotation of the feed screw in a clockwise direction is continued until the feed screw is turned out of the shaft 26.

In the use of the machine the nut 51 is actuated to permit the clamp members 42 being spread apart by the action of the spring 50. A pipe 73, the end face 74 of which is to be faced, is then arranged between the inner edges 44 of the clamp members 42 at a position in which a ferrule member 75, forming part of a pipe fitting (not shown), is located above the top level of the upper surfaces 46 of the clamp members, as viewed in Fig. 1. The nut 51 is then threaded towards the projections 27 to move the clamp members 42 inwardly toward each other to positions against the outer peripheral surface of the pipe 73. During this inward movement of the clamp members 42 the machine is adjusted to position the lower edge of the ferrule 75 in engagement with the top surfaces 46 of the clamp members 42, it being understood that the pipe is held against movement in a bench vise or the like.

On a continued inward movement of the clamp members 42 into gripping engagement with the outer peripheral surface of the pipe 73 the machine is centered relative to the pipe by the support of the ferrule 74 on the surfaces 46 and the engagement of the clamp members 42 with the pipe 73. Since the clamp members 42 are pivotally supported by parallel link systems from their corresponding projections 27 a full bearing engagement of the surfaces 44 with the pipe 73 takes place for any moved position of the clamp members 42, and in turn for any diameter of the pipe 73. This is clearly apparent from a comparison of Fig. 1, in which a large diameter pipe 73 is shown held within the gripping unit 21, with Fig. 6, in which a small diameter pipe 73a is shown in a supported position within the gripping unit 21.

With the machine (Fig. 1) supported on the pipe the feed screw 67 is adjusted to bring the cutting portion 83 of the facing tool 22 into cutting engagement with the pipe face 74. With the pipe 73 held stationary in a bench vise or the like the unit 23 is rotated relative to the body member 20 to operate the facing tool 22. This procedure is repeated until a desired facing is accomplished on the pipe 73. On completion of the facing operation the cutting portion 83 is retracted, away from the pipe face 74, by actuation of the feed screw 67 and the nut 51 is operated to release the clamp members 42 from the pipe 73.

It is contemplated that the end 84 of the shaft 26 be of a reduced diameter and threaded to provide for a quick change of cutting portions depending upon the size of the pipe to be faced. Thus the cutting portion 83a in Fig. 6 is merely substituted for the cutting portion 83 in Fig. 1 when a pipe 73a of small diameter is to be faced.

During the operation of the machine of this invention it sometimes happens that, on rotation of the unit 23, the machine is tipped laterally out of co-axial alignment with the pipe being worked on by virtue of an unequal application of manual pressure on the handle members 53. This tilting action, of course, results in the facing tool being moved out of alignment with the end of the pipe to be faced.

In order to positively maintain the machine in proper alignment with a pipe being worked on there is provided a base member, indicated generally as 86 (Figs. 11–14, inclusive), comprised of a pair of hinged sections 87 pivoted together at one end by a bolt 88 and normally held in a spread apart or open position by a spring member 89. The inner adjacent edges of the sections 87 are formed with a series of mating semi-circular recesses 89, 90 and 91, which in a closed position of the sections 87 provide openings 92, 93 and 94, respectively, extended transversely through the base member. The openings 92, 93 and 94 are adapted to receive pipes of varying diameters generally used in the pipe systems of dairies. Thus for example the opening 94 may receive a one-inch pipe, the opening 93 a two-inch pipe, and the opening 92 a three-inch pipe.

The front face 96, of the base member 86, is formed with grooves 97, 98 and 99 which are extended radially, from the openings 92, 93 and 94, respectively. The opposite sides 101 of the base member 86 are of a stepped construction adapted to provide for the support of the base member 86 at the various steps, within a usual bench vise 102 (Fig. 11).

In the use of the base member 86 the jaws 103 of the vise 102 are initially moved to an open position to receive the base member therebetween in its spread apart or open position. Assuming that a pipe 75 is to be positioned within the opening 93, the base 86 is supported between the vise jaws 103 on the shoulders 104 on the base sides 101. After the pipe 75 has been positioned between the semi-circular recesses 90 the vise jaws 103 are closed, to in turn close the sections 87 on the pipe 75. The facing machine is then assembled relative to the end of the pipe 75 to be faced in all respects similar to its assembly previously described in connection with Fig. 1.

On completion of this assembly the base member 86 is adjusted relative to the facing machine until the projections 108 on the clamp members 42 are positioned within the grooves 98 on the front face 96 of the base member 86. With the projections 108 supported against the bottoms of the grooves 98 the machine is positively held against any lateral tipping movement relative to the pipe 75, regardless of any variation in the manual pressure applied on the handles 53 of the operating unit 23.

When a large diameter pipe, using the opening 92, is to be faced a plug member 109 (Fig. 15) is positioned within the opening 93. The plug 109 has a groove 111 in its front face adapted to be arranged in alignment with the groove, indicated as 97a, in the front face 96 of the base 86. The plug 109 thus provides a full bearing support for the clamp member 42 positioned within the groove 97a.

The base member 86 also serves as a device for holding a pipe and guiding a saw, when a worn fitting is to be cut off from the pipe. Thus as best appears in Figs. 12 and 13 the back face 112 of the base member is formed with pairs of tapped holes 113 arranged at opposite sides of the opening 94 and adapted to receive screws 114 for securing saw guides 116 to the base member. Similar pairs of tapped holes (not shown) are arranged at opposite sides of the opening 93 for also receiving the screws 114. The guides 116 are cut away at their free ends to provide a space 117 between the guides and the back face 112 of the base 86.

When a three-inch pipe, for example, is to be cut off the guides 116 are in their positions shown in Figs. 12 and 13. With the pipe arranged within the opening 92, and with the base member 86 being of a substantial width to provide against any lateral movement of the pipe therein, the saw is positively guided within the space 117 to make a straight cut transversely of the pipe. In the event a two-inch pipe is to be cut, and the opening 94 is to be used, the saw guides 116 are secured to the base 86 by the screws 114 at the tapped holes 113. When a one-inch pipe is to be cut, so that the opening 94 is to be used, the saw guides 116 are secured in their dotted line positions illustrated in Fig. 13.

From a consideration of the above description it is seen that the invention provides a pipe facing machine which is of a simple and rugged construction, and comprised of a few number of operating parts capable of adjustment to adapt the machine for operating with equal convenience and efficiency on pipes of varying diameter. As previously mentioned pipe fittings now in general use embody ferrules of the "tapered" and "flat" types. By merely changing the facing tool the machine is readily applicable to the facing of either types of these ferrules, with the flat ferrules being illustrated in Figs. 1 and 6 of the drawings. Further the machine of this invention embodies a pipe holding vise and pipe cutter guide, to facilitate the removal of worn fittings, and the replacement of fittings with tapered ferrules, by fittings having flat ferrules and vice versa. By virtue of the small compact size and light weight of the over-all machine it may be easily and readily operated by one man for facing pipe fittings which are permanently assembled to vats or to the various machines used in the processing of milk and food.

Although the invention has been described with respect to a preferred embodiment thereof it is to be understood that it is not to be so limited since changes and modifications can be made therein which are within the full intended scope of this invention as defined by the appended claims.

I claim:

1. A machine for facing the end of a pipe member including a body member having a longitudinally extended bore formed therein, a plurality of projections adjacent one end of said body member extended radially from the axis of said bore, a plurality of clamp units corresponding to said projections, with each of said units including a pair of pivoted links, means pivotally connecting said pair of links at one of their ends in a spaced relation longitudinally of a corresponding projection, a clamp member pivotally connected between the opposite ends of said pair of links, with a corresponding projection, a pair of links and a clamp member constituting a parallel link system providing for the movement of said clamp member, longitudinally of said projection, to moved positions in planes normal to the axis of said bore, a cutting tool including a shaft positionable in said bore for rotatable support in said body member, a cutting portion at one end of said cutting tool located between said clamping units, means for moving said cutting portion toward and away from said pipe end face, and means for rotating said cutting tool.

2. A machine, for facing the end of a pipe having a ferrule adjacent said end thereof, comprising a body member, a cutting tool rotatably supported in said body member having a cutting portion spaced from one end of said body member, a plurality of clamp members extended radially from the longitudinal axis of said cutting tool, pipe engaging edges on said clamp members, parallel links pivotally connected with said clamp members and with said body member to provide for said pipe engaging edges being in planes parallel to the longitudinal axis of said cutting tool for all moved positions of said clamp members, surface portions on said clamp members contiguous with said pipe engaging edges and in planes normal to said edges adapted to engage one side of said ferrule, whereby a pipe, gripped between said clamp members is supported in a centered position relative to said longitudinal axis, means for feeding said cutting portion relative to the end face of said pipe, and means for rotating said cutting tool.

3. In a machine for facing the end of a pipe, a body member, a pipe holding and clamping unit mounted adjacent one end of said body member, means on said body member for actuating said unit, a cutting tool including a shaft rotatably supported in said body member, a cutting portion at one end of said shaft adapted for cutting engagement with the end face of a pipe clamped within said unit, with the other end of said shaft being of a square shape in cross section and projected outwardly from the opposite end of said body member, means for rotating said cutting tool including a cap member with an annular cavity therein having a sidewall of a stepped contour, with the bottom wall of said cavity having a square bore therein for receiving the projected square end of said shaft, a split ring, said opposite end of the body member having a peripheral groove therein for receiving said ring, with said opposite end of the body member and said ring being rotatably received within said cavity with said ring against one of the steps in said cavity sidewall, a collar member loosely mounted about the opposite end of said body member and movable within said cavity against a second step on said cavity sidewall and into contact engagement with said ring, means for holding said collar member within said cavity, and means on said cap member for moving said cutting tool longitudinally of said body member.

4. A machine for facing the end of a pipe comprising a body member, a cutting tool rotatably supported in said body member including a cutting portion spaced outwardly from one end of said body member, a pipe clamping and holding unit at said one end of the body member including a plurality of clamp members radially extended from the axis of said cutting portion, means for concurrently operating said clamp members to grip and release a pipe positioned therebetween, rotary means on said body member for operating said cutting tool including a handle member, means rotatable on said rotary means and connected with said cutting tool to feed said cutting portion relative to the end face of a pipe held in said unit, means for supporting said cutting member against lateral tipping movement relative to said pipe during a facing operation, including a base member comprised of two hinged sections having their inner adjacent edges formed with mating semi-circular recesses to form a transverse opening in said base member to receive said pipe, and stationary means for clamping said hinged sections on said pipe, with one side of said base member having a plurality of grooves extended radially from the center of said circular opening, with said clamp members having portions receivable in said grooves in supported positions against the bottoms of said grooves.

RAYMOND P. NORTON.

REFERENCES CITED

The following references are of record in the file of this patent:

UNITED STATES PATENTS

| Number | Name | Date |
|---|---|---|
| 378,196 | Dunn | Feb. 21, 1888 |
| 2,087,527 | Norton | July 20, 1937 |
| 2,416,228 | Sheppard | Feb. 18, 1947 |